US005449911A

United States Patent [19]

Crezee

[11] Patent Number: 5,449,911

[45] Date of Patent: Sep. 12, 1995

[54] METHOD AND APPARATUS FOR MEASURING FORM PARAMETERS OF ITEMS

[75] Inventor: Leonard P. Crezee, Snelrewaard, Netherlands

[73] Assignee: Aweta B.V., Nootdorp, Netherlands

[21] Appl. No.: 332,438

[22] Filed: Oct. 31, 1994

Related U.S. Application Data

[63] Continuation of Ser. No. 63,955, May 20, 1993, abandoned.

[30] Foreign Application Priority Data

Apr. 5, 1993 [NL] Netherlands ........................ 9300596

[51] Int. Cl.[6] ........................................ G01N 21/47

[52] U.S. Cl. .............................. 250/341.7; 250/341.8; 355/386

[58] Field of Search ........................ 356/386, 387, 385; 250/341, 341.7, 341.8

[56] References Cited

U.S. PATENT DOCUMENTS

| | | | |
|---|---|---|---|
| 3,282,419 | 11/1966 | Rock, Jr. | 209/586 |
| 4,866,285 | 9/1989 | Simms | 250/495.1 |
| 5,020,675 | 6/1991 | Cowlin et al. | 209/538 |

FOREIGN PATENT DOCUMENTS

| | | | |
|---|---|---|---|
| 2920804 | 11/1980 | Germany | 356/385 |
| 2-300619 | 12/1990 | Japan | 356/386 |

*Primary Examiner*—Constantine Hannaher
*Attorney, Agent, or Firm*—Griffin, Butler, Whisenhunt & Kurtossy

[57] ABSTRACT

A method and an apparatus for measuring form parameters of items (2) utilizing a camera (10) which is sensitive to infrared light, and, while passing the items through a field of view (11) of the camera (10), the items are illuminated with light flashes of approximately 1 ms by solid state LEDs (41), which are arranged at the centerline of the items (2) and produce a light beam (43) which includes an angle of approximately 45° with the direction of conveyance of the items (2).

15 Claims, 2 Drawing Sheets

METHOD AND APPARATUS FOR MEASURING FORM PARAMETERS OF ITEMS

This application is a continuation, of Ser. No. 08/063,955, filed May 20, 1993, now abandoned.

This invention relates to a method and an apparatus for measuring form parameters of items, utilizing a camera.

BACKGROUND ART

Such a method and apparatus are known in practice in connection with the classification and/or sorting of items, more particularly vegetables and fruits, such as apples, pears, tomatoes, paprikas, and the like. The items are passed through a field of view of the camera and the image obtained by the camera is processed in an image-processing apparatus so as to provide the desired form parameters. The camera used is a normal black-and-white or color camera.

DISADVANTAGES OF THE BACKGROUND ART

A number of disadvantages are associated with the known method. A first disadvantage relates to the empirically established fact that the color of an item has an influence on the size as measured with the camera. In particular, the dimensions of a light item as measured by the camera are larger than those of a dark item of identical physical dimensions.

A second disadvantage relates to the fact that a good measuring result requires a good contrast between the items to be measured and the background. That background is formed by the conveying means, such as a roller conveyor, which conveys the items through the field of view of the camera. The standard color of those rollers is black and it has been found that the contrast relative to dark items is so low that thereby a relatively great number of measuring errors are introduced. This applies especially to a particular type of apple grown in the U.S.A., viz., the "Red Delicious" apple, which is sometimes almost black. In practice it is attempted to solve this problem by utilizing a roller conveyor of a light-blue color, but this involves the disadvantage that, owing to the accumulation of dirt, the roller conveyor becomes darker with the passage of time, so that the contrast lessens. In addition, such accumulation occurs in an undefined manner. It is a further drawback that no use can be made of standard (black) parts.

A third disadvantage relates to the fact that the result of the measurement is influenced by factors of the surroundings, such as daylight or light being used in another measuring process, for instance the color measurement described in Dutch patent application 92.00236.

A fourth disadvantage relates to the capacity of the method, expressed in numbers per unit time. It will be clear that the camera can detect a good image of the item when the item is maintained in a stationary position for a given time within the field of view of the camera, but in that case the capacity is unacceptably low. Moreover, the method is also intended to be used in existing sorting machines, and the method for measuring form parameters should not lower the capacity of those sorting machines. Accordingly, the items are passed through the field of view of the camera at a given speed.

As a result of that speed, each item travels a given distance within the field of view of the camera during the time when the camera records an image. The image of the item as measured by the camera is therefore, in a manner of speaking, spread out in the direction of movement of the items, so that measuring inaccuracies are introduced. The higher the speed of the items, the greater such inaccuracy will be. In practice, this problem is dealt with by illuminating the items with short light flashes by means of flash tubes. Because of the short light flash, the camera, as it were, sees a frozen image of the item, which is the so-called stroboscope effect. This solution, however, has been found to be unsatisfactory in practice since the flash tubes, under the desired operating conditions, have only a short lifetime of approximately 10,000 flashes, while, further, the shorter the duration of the light flashes supplied by those flash tubes, the shorter the lifetime of those flash tubes will be. Moreover, the flash tubes are sensitive to mechanical vibrations such as may occur in sorting machines, and they also suffer from the high temperatures occurring as a result of the continuous flashing operation.

A further problem involved here is that the measuring station must be screened from the surroundings, not only to prevent the possibility of surrounding light reaching the measuring station and affecting the measurement, but also, and not in the least, to prevent the possibility of the light flashes reaching the surroundings from the measuring station, since this is particularly disturbing to the staff working there.

OBJECTIVES OF THE INVENTION

The objects of the present invention are to remove the disadvantages mentioned. In particular, it is an object of the present invention to provide a method and an apparatus for measuring form parameters of items, in which the influence of the color of an item on the size measured with the camera is zero or at any rate reduced to a great extent.

A further object of the present invention is to provide such a method and apparatus, in which the color of the background does not influence the contrast or at any rate does so to a markedly reduced extent, so that use can be made of standard parts.

Yet another object of the present invention is to provide such a method and apparatus, in which the measurement is not influenced by surrounding light or, at any rate, is influenced to a highly reduced extent. In particular, the object of the invention is to provide such a method and apparatus which are suitable to be combined with the method and apparatus for carrying out a color measurement as described in Dutch patent application 92.00236.

A yet further object of the present invention is to provide such a method and apparatus which have a high processing capacity and, therefore permit the speed of conveyance of the items through the field of view of the camera to be relatively high.

DISCLOSURE OF THE INVENTION

According to an important aspect of the present invention, to that end use is made of infrared light, preferably in the range of 700 nm–1000 nm, the range about approximately 850 nm being preferred. This makes the measurement insensitive to the color of the items and the contrast with the background, while the light flashes in this wavelength range are not disturbing to the staff in the surroundings.

According to another important aspect of the present invention, use is made of solid state LEDs as light sources, which are capable of providing a very short light flash of a duration shorter than 20 ms and preferably of the order of 1 ms.

DESCRIPTION OF THE DRAWINGS

Further aspects, features and advantages of the present invention will be clarified by the following detailed discussion of a preferred embodiment with reference to the drawings, in which:

In FIG. 1, a preferred embodiment of an apparatus for carrying out the method according to the invention is generally indicated by the reference numeral 1. The apparatus 1 comprises a camera 10, means 20 for conveying items 2 through the field of view 11 of the camera 10, and means 30 for illuminating the items 2. The field of view 11 of the camera 10, which is preferably a matrix camera, is bounded by broken lines in FIG. 1. FIG. 1 further shows that a mirror 12 may be arranged in front of the camera 10. The object of such an arrangement is merely to limit the overall height of the apparatus 1 in practice, as is known per se.

Figure 1:
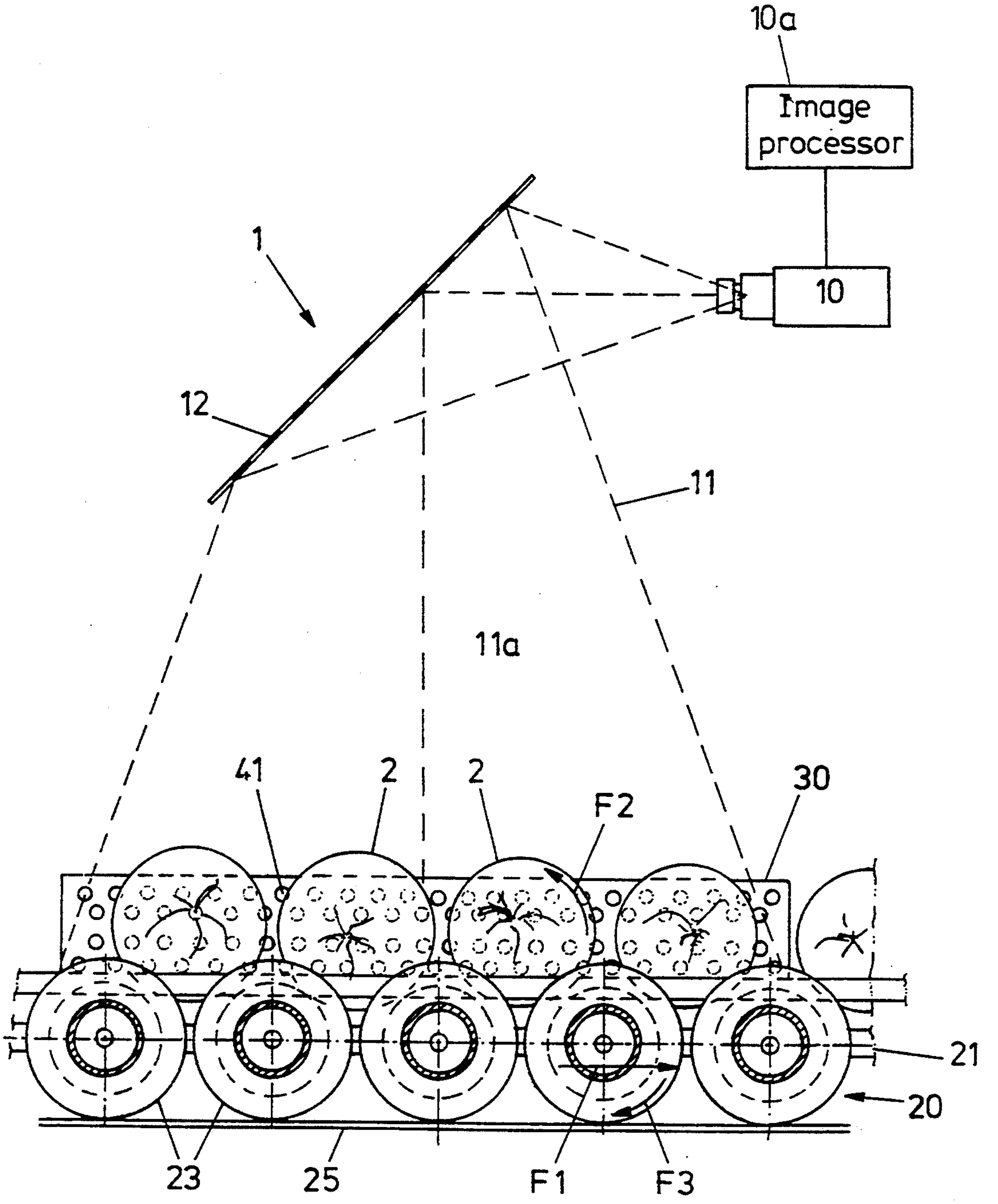
FIG. 1 is a schematic side elevation of a part of a preferred embodiment of an apparatus for carrying out the method according to the invention.

The means 20 are adapted to convey the items 2 from left to right, as indicated by the arrow F1 in FIG. 1, through the field of view 11 at a predetermined speed of translation $v_1$, while simultaneously imparting a rotation to the items 2, as indicated by the arrow F2 in FIG. 1, the axis of rotation being directed perpendicularly to the direction of conveyance F1.

In the example shown in FIG. 1, the conveying means 20 comprise a roller conveyor 21. Such a roller conveyor 21, shown in top plan view in FIG. 2 and in front view in FIG. 3, comprises rollers 22 which, parallel to each other, have their ends rotatably mounted on an endless chain, equidistantly spaced, the chain being driven. The rollers 22 have a substantially cylindrical shape and may have a contour that is suitable for centering and rotating the items. In the embodiment shown, the rollers 22 comprise a predetermined number of rotating/centering elements 23, whose shape substantially corresponds to that of two truncated cones mounted against each other in mirror-symmetrical relationship. According to the invention, the rotating/centering elements 23 are preferably made in the standard color black, which means a saving of cost.

When the roller conveyor 21 is driven to convey the items 2, the rollers 22 will rotate (arrow F3 in FIG. 1) so as to rotate the items 2. The rollers 22 may be supported on a supporting surface arranged stationarily relative to a machine frame, but preferably the rollers 22 are supported by an endless friction belt 25 mounted on driven wheels or rollers, arranged at the field of view 11, in order to influence the speed of rotation of the rollers 22 and hence the speed of rotation of the items 2. Since such a roller conveyor 21 and friction belt 25 are already known and the nature and construction thereof do not form a subject of the present invention, and knowledge of their operation is not necessary for a person of ordinary skill to have a good understanding of the present invention, they will not be discussed in further detail; for a detailed description thereof, reference can be made to Dutch patent application 90.00236.

A stationary frame 31 extends in the direction of conveyance, above the rollers 22, at any rate at the field of view 11. Mounted on the stationary frame 31 are light sources 40, preferably next to the rotating/centering elements 23 of the rollers 22. The light sources 40 are disposed at a height such that, when items 2 are being conveyed on the roller conveyor 21, they are located at the centerline of the items 2, preferably substantially centered relative to that centerline. In practice, of course, the items 2 do not all have exactly the same size. Accordingly, the light sources 40 preferably have a vertical dimension which has been chosen with regard to their height position, such that when they are being passed by items 2 of the largest dimension to be expected, the light sources 40 can illuminate at least a part of the item located above the centerline thereof, and when they are being passed by items 2 of the smallest dimension to be expected, the light sources 40 can illuminate at least a part of the item located at the centerline thereof.

To enable the apparatus 1 to be simply adapted to different kinds of items 2, the light sources 40 are preferably height-adjustable.

In a preferential embodiment, the light sources 40 comprise a plurality of solid state LEDs 41 which radiate infrared light of a wavelength in the range of approximately 700 nm to approximately 1000 nm, the range around approximately 850 nm being preferred. The camera 10 has been selected to be sensitive to this wavelength. In a tested embodiment, each LED 41 radiates its light in a beam 43 having an apex angle $\alpha$ in the range of approximately 5° to approximately 15°. Each LED 41 is arranged such that the axis of the beam 43 is substantially located in a horizontal plane and includes an angle of approximately 45° with the direction of conveyance. As is shown clearly in FIG. 3, the LEDs 41 in this embodiment are arranged in four horizontal rows $42_1$, $42_2$, $42_3$ and $42_4$ arranged above each other, the LEDs 41 in each row being directed in the same direction, while the LEDS 41 in the topmost row $42_1$ and the third row $42_3$ are oppositely directed to the LEDs 41 in the second row $42_2$ and the lowermost row $42_4$. By "opposite" is meant that the LEDs 41 may be directed at an angle of approximately 45° relative to the direction of transport, either in forward or in rearward direction, so as to illuminate the rear side and the front side, respectively, of passing items 2.

Figure 2:
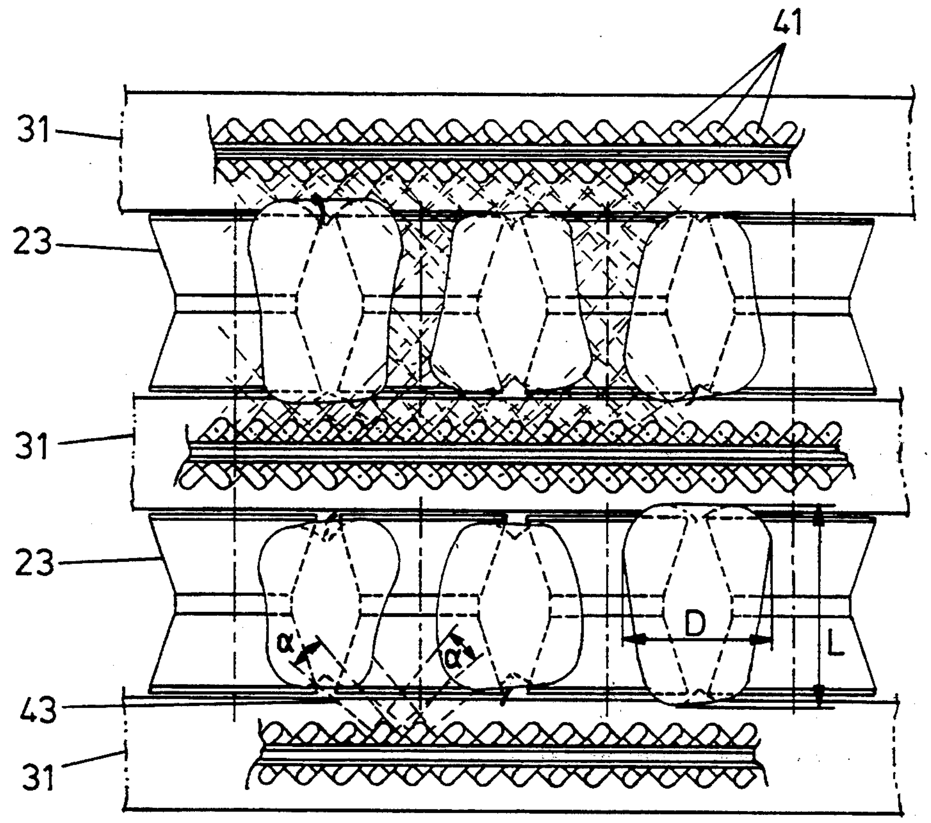
FIG. 2 is a schematic top plan view of a part of a conveyor track used in that apparatus.
Figure 3:
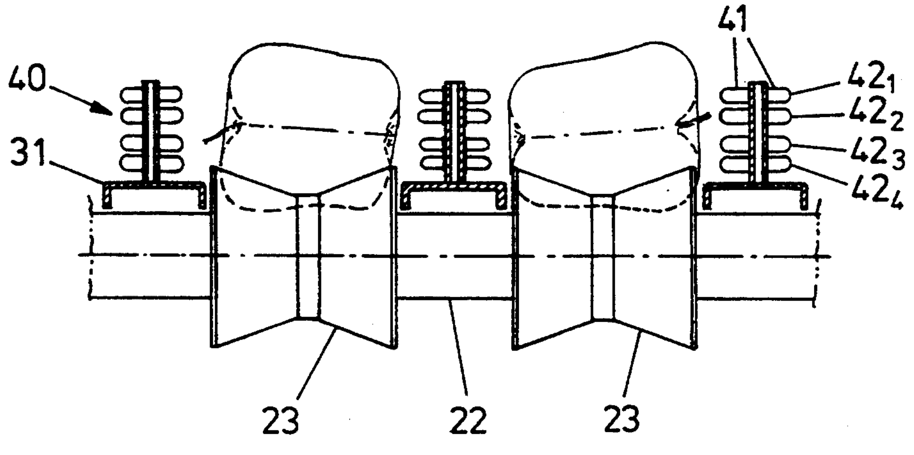
FIG. 3 is a schematic sectional view of that conveyor track.

By virtue of the features described in the foregoing, a good illumination is provided of the contour of the items 2 as observed by the camera 10 as is clearly apparent from FIG. 2. The LEDS can be controlled to provide a short light flash, of a duration of approximately 1 ms, so that the camera 10 can observe the items 2 only for a very short time, which means that the camera 10 observes a substantially stationary image of the items 2, in spite of a fairly high speed of conveyance.

An image signal provided by the camera 10 is applied to an image-processing apparatus 10A, which may be an image-processing apparatus which is known per se.

The image-processing apparatus may be adapted to calculate a predetermined form parameter from the image signal received.

On the basis of the calculated form parameter the image-processing apparatus can generate a control signal for a downstream sorting apparatus for sorting the items.

Depending on the kind of items 2, and depending on the wish of the user of the apparatus 1, that form parameter may for instance simply be the largest length dimension $L_{max}$, or the largest transverse dimension $D_{max}$. The $L_{max}/D_{max}$ ratio can also be used as a form parameter.

It is also possible for the image-processing apparatus to be adapted to determine the largest transverse dimension $D_{max}$ and the smallest transverse dimension $D_{min}$ of item 2, and to calculate the $D_{max}/D_{min}$ ratio as form parameter. It will be clear, however, that the user is free to program the image-processing apparatus to calculate from the image signal received any form parameter that is considered suitable. The image-processing apparatus may be adapted to receive a predetermined number of image signals from each item 2, in each case obtained from a different rotational position of that item 2, and to calculate the desired form parameter as the average or, conversely, an extreme value of the measured values.

According to a further elaboration of the concept of the invention, the image-processing apparatus, for the purpose of a quality control, may be adapted to examine the image signal received for characteristics which are representative of attack or infection of the item. It has been found that damaged spots on vegetables or fruits as a result of fall or any other impact, or as a result of fungal attack, can be observed sooner and more clearly under infrared light than under visible light.

It will be clear to a person of ordinary skill that it is possible to change or modify the embodiment of the apparatus according to the invention as shown without departing from the concept of the invention or the scope of protection. It will further be clear that the invention is not limited to use in vegetables or fruit.

I claim:

1. A method for measuring form parameters of items, comprising:

(A) providing an infrared light sensitive camera capable of providing an image signal suitable for image processing;

(B) conveying items disposed on a movable conveyor through a field of view of the camera, and wherein an optical axis of the camera is directed substantially perpendicular to a plane of the conveyor; and (C) illuminating the items on the conveyor with infrared light directed substantially in planes which are substantially parallel to a plane of the conveyor and lying generally along centerlines of the items.

2. A method as claimed in claim 1, wherein the items, at least within the field of view of the camera, are illuminated with infrared light which has a wavelength in the range of 700 nm–1000 nm.

3. A method according to claim 1, wherein the items, at least in the field of view of the camera, are illuminated by means of solid state LEDs which are controlled to emit light flashes of a duration of less than 20 ms.

4. A method as claimed in claim 1 wherein an image signal is generated by said camera and is processed for calculating a $L_{max}/D_{max}$ ratio, $L_{max}$ being a largest length dimension and $D_{max}$ being a largest transverse direction of the item.

5. A method as claimed in claim 1, wherein the infrared camera provides an image signal which detects deviant spots of the items representing damage or fungal attack of the items.

6. A method as claimed in claim 1, wherein series of measurements are performed on the items while the items are in a series of different rotational positions, and the desired form parameter is calculated as an average or an extreme value of measured values.

7. The method of claim 1, wherein the illumination is by light sources which are height-adjustable and a height position of the light sources can be set so as to correspond generally to the height of centerlines of the items when they are located in the field of view of the camera.

8. The method of claim 7, wherein the light sources radiate a light beam having an axis which is substantially located in a horizontal plane and includes an angle of approximately 45° with a direction of conveyance of the items.

9. The method of claim 8, wherein the light sources are arranged in horizontal rows, the light sources in each row being directed in the same direction, and the light sources in each row being directed oppositely to the light sources in a neighboring row or rows.

10. A method as claimed in claim 1 further comprising providing a color camera capable of performing color measurements of the items and illuminating the items with visible light so as to make color measurements thereof.

11. The method of claim 1, wherein the infrared light illumination is in the form of flashes having a wavelength in the range of 700 to 1000 nm.

12. The method of claim 11, wherein the infrared light flashes have a duration of less than 20 ms.

13. The method of claim 12, wherein the duration is about 1 ms.

14. The method of claim 1, wherein the camera is a matrix camera.

15. A method for measuring form parameters of items, comprising:

(A) providing an infrared light sensitive camera capable of providing an image signal suitable for image processing;

(B) conveying items disposed on a horizontally movable conveyor through a field of view of the camera, and wherein the camera is disposed above the conveyor; and (C) illuminating the items on the conveyor with infrared light directed substantially in planes which are substantially parallel to a plane of the conveyor and lying generally along centerlines of the items.

* * * * *